(12) United States Patent
Kim et al.

(10) Patent No.: US 8,270,704 B2
(45) Date of Patent: Sep. 18, 2012

(54) METHOD AND APPARATUS FOR RECONSTRUCTING 3D SHAPE MODEL OF OBJECT BY USING MULTI-VIEW IMAGE INFORMATION

(75) Inventors: Ho Won Kim, Daejeon (KR); Chang Woo Chu, Daejeon (KR); Bon Ki Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 946 days.

(21) Appl. No.: 12/314,678

(22) Filed: Dec. 15, 2008

(65) Prior Publication Data
US 2009/0154794 A1 Jun. 18, 2009

(30) Foreign Application Priority Data
Dec. 15, 2007 (KR) .................. 10-2007-0131730

(51) Int. Cl.
*G06K 9/00* (2006.01)
*G06T 15/00* (2006.01)
*H04N 13/00* (2006.01)

(52) U.S. Cl. ............ 382/154; 382/285; 345/419; 348/42
(58) Field of Classification Search .................. 382/154, 382/285; 345/419–427; 356/12–14; 348/42–60; 359/462–477; 352/57–65; 33/20.4; 353/7–9; 378/41–42; 396/324–331
See application file for complete search history.

(56) References Cited

U.S. PATENT DOCUMENTS

| | | | |
|---|---|---|---|
| 6,975,756 B1 | 12/2005 | Slabaugh et al. | |
| 7,142,726 B2 * | 11/2006 | Ziegler et al. | 382/285 |
| 7,212,664 B2 | 5/2007 | Lee et al. | |
| 2003/0067462 A1 * | 4/2003 | Fujiwara | 345/420 |
| 2006/0232583 A1 * | 10/2006 | Petrov et al. | 345/419 |

FOREIGN PATENT DOCUMENTS
JP 2005-251000 9/2005

OTHER PUBLICATIONS

"Probabilistic voxel coloring relaxing photo hull limitations", Ho-Won Kim et al., 13th Image Processing and Image Understanding Workshop, 2001.
"Hybrid Silhouette Extraction Using Color and Gradient Information", Young Hoon Joo et al., International Journal of Fuzzy Logic and Intelligent Systems, 2007, vol. 17, pp. 913-918.
Korean Office Action mailed Aug. 21, 2009 in corresponding Korean Patent Application 10-2007-0131730.
G. Vogiatzis et al., "Multi:view Stereo via Volumetric Graph-cuts", CVPR, pp. 391-398, 2005.
Svetlana Lazebnik et al., "Projective Visual Hulls", IJCV, vol. 74, Issue 2, pp. 137-165, 2007.

* cited by examiner

*Primary Examiner* — Aaron W Carter
(74) *Attorney, Agent, or Firm* — Staas & Halsey LLP

(57) ABSTRACT

A method for reconstructing a 3D shape model of an object by using multi-view image information, includes: inputting multi-view images obtained by photographing the object from multiple viewpoints in a voxel space, and extracting silhouette information and color information of the multi-view images; reconstructing visual hulls by silhouette intersection using the silhouette information; and approximating polygons of cross-sections of the visual hulls to a natural geometric shape of the object by using the color information. Further, the method includes expressing a 3D geometric shape of the object by connecting the approximated polygons to create a mesh structure; extracting color textures of a surface of the object by projecting meshes of the mesh structure to the multi-view image; and creating a 3D shape model by modeling natural shape information and surface color information of the object.

10 Claims, 5 Drawing Sheets

METHOD AND APPARATUS FOR RECONSTRUCTING 3D SHAPE MODEL OF OBJECT BY USING MULTI-VIEW IMAGE INFORMATION

CROSS-REFERENCE TO RELATED APPLICATIONS

The present invention claims priority of Korean Patent Application No. 10-2007-0131730, filed on Dec. 15, 2007, which is incorporated herein by reference.

FIELD OF THE INVENTION

The present invention generally relates to a technology for reconstructing a 3D shape model of an object and, more particularly, to a method and an apparatus for reconstructing a 3D shape model of an object, by using multi-view image information suitable for carrying out reconstruction of a 3D shape model of an object using silhouette information and color information of multi-view images captured by multi-view cameras.

BACKGROUND OF THE INVENTION

Conventional technologies for capturing a shape of an object are largely classified into two groups. The first group scans shape information of an object by using an active sensor that uses lasers or pattern rays, and extracts a texture of a scanned mesh from a color image obtained by photographing the object. This group is used mainly to create a model of high quality by restriction to a still image.

The second group reconstructs shape information and surface color information of an object from image information obtained by photographing a shape of the object from multiple viewpoints, by using a passive camera. This group is classified, in more detail, into a stereo method in which 3D position information is reconstructed on the basis of triangulation using corresponding points of a stereo image and a volumetric method in which a voxel space containing voxels is predefined, and the voxels are projected to images so as to determine existence of the voxels using coincidence of colors in projection regions.

Recent studies enable multi-view image based reconstruction of a 3D shape model of an object to be carried out in order to realize a 3D shape model of high quality, in which case reconstruction of a 3D shape model of a static object itself is severely time-consuming. However, they show results very close to the reconstruction quality of laser scanners. On the other hand, reconstruction of a 3D shape model of a dynamic object depends mainly on silhouette information of multi-view images, in which case the 3D shape model of the dynamic object may be reconstructed in real time but its reconstruction quality is considerably low as compared with that of a 3D shape model of a static object.

As a result, in order to reconstruct a high-quality 3D shape model of a dynamic object, it is necessary to reconstruct 3D shapes of static objects under the assumption that a multi-view moving image obtained by photographing a dynamic object may be divided into multiple static objects in units of frames and express the 3D shape model of the dynamic object by accumulating the reconstructed 3D shapes of the static objects, but this is severely time-consuming. Moreover, although a state-of-the-art technology for reconstruction of a 3D shape model using graph-cut shows a reconstruction quality level similar to that of laser scanners, it is difficult to accurately satisfy restrictions against silhouettes of multi-view images and realize a same image when the reconstructed result is projected to multi-view images again.

As mentioned above, the conventional technologies for capturing a shape of an object are time-consuming in calculation for reconstruction of a static object and cause difficulties in reconstruction of a same 3D image of a dynamic object.

SUMMARY OF THE INVENTION

In view of the above, the present invention provides a method and an apparatus for reconstructing a 3D shape model of an object, by using multi-view image information suitable for carrying out reconstruction of a 3D shape model of an object using silhouette information and color information of multi-view images captured by multi-view cameras.

The present invention also provides a method and an apparatus for reconstructing a 3D shape model of an object that contains information about a 3D geometric shape of the object and natural surface color textures of the object, by using silhouette information and color information of multi-view images.

In accordance with a first aspect of the present invention, there is provided a method for reconstructing a 3D shape model of an object by using multi-view image information, the method including: inputting multi-view images obtained by photographing the object from multiple viewpoints in a voxel space containing voxels of a predetermined size in a 3D space containing the object, and extracting silhouette information and color information of the multi-view images; reconstructing visual hulls by silhouette intersection using the silhouette information; approximating polygons of cross-sections of the visual hulls to a natural geometric shape of the object by using the color information, along the cross-sections of the visual hulls; expressing a 3D geometric shape of the object by connecting the approximated polygons to create a mesh structure; extracting color textures of a surface of the object by projecting meshes of the mesh structure to the multi-view image; and creating a 3D shape model by modeling natural shape information and surface color information of the object that contain the mesh structure and the color textures corresponding to the meshes of the mesh structure.

In accordance with a second aspect of the present invention, there is provided an apparatus for reconstructing a 3D shape model of an object by using multi-view image information, the method comprising: a silhouette/color information extractor receiving multi-view images obtained by photographing the object from multiple viewpoints in a voxel space containing voxels of a predetermined size in a 3D space containing the object, and extracting silhouette information and color information of the multi-view images; a visual hull reconstructor reconstructing visual hulls by using silhouette intersection reflecting the silhouette information; a polygon approximator approximating polygons of cross-sections of the visual hulls to a natural geometric shape of the object by using the color information, along with the cross-sections of the visual hulls; a mesh structure creator expressing a 3D geometric shape of the object by connecting the approximated polygons to create a mesh structure; a color texture map creator extracting color textures of a surface of the object by projecting meshes of the mesh structure to the multi-view image; and a 3D shape model creator creating a 3D shape model by modeling natural shape information and surface color information of the objects that contain the mesh structure and the color textures corresponding to the meshes of the mesh structure.

Main effects and advantages achieved by exemplary embodiments of the present invention are simply described as follows.

In accordance with the present invention, in reconstruction of information about a 3D shape model of an object, a reconstruction quality level of a graph-cut method that is corresponds to that of laser scanners is expected within a reconstruction time range of a silhouette intersection method mainly used in reconstruction of a shape of a dynamic object. While a result reconstructed by the graph-cut method does not satisfy restrictions against silhouettes of multi-view images, the present invention satisfies restrictions against silhouettes of multi-view images and shows an excellent reconstruction quality in reconstruction of a 3D shape model of a dynamic object in real time due to a realistic image obtained by rendering the reconstructed result.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

The present invention reconstructs a 3D shape model of an object that contains information about a 3D geometric shape and natural surface color textures of the object, by using silhouette information and color information of multi-view images.

A 3D shape model is reconstructed in a 3D space containing an object, and multi-view images are already calibrated with respect to a world coordinate system of a voxel space, and each multi-view image is separated into a foreground containing the object and a background. A 3D shape model of an object is reconstructed using color information of foregrounds of multi-view images, and the reconstructed 3D shape model realizes all color information of pixels in the foregrounds of the multi-view images.

In the following embodiments of the present invention, plans for reconstruction of a 3D shape model of an object using multi-view images will be described in detail.

Figure 1:
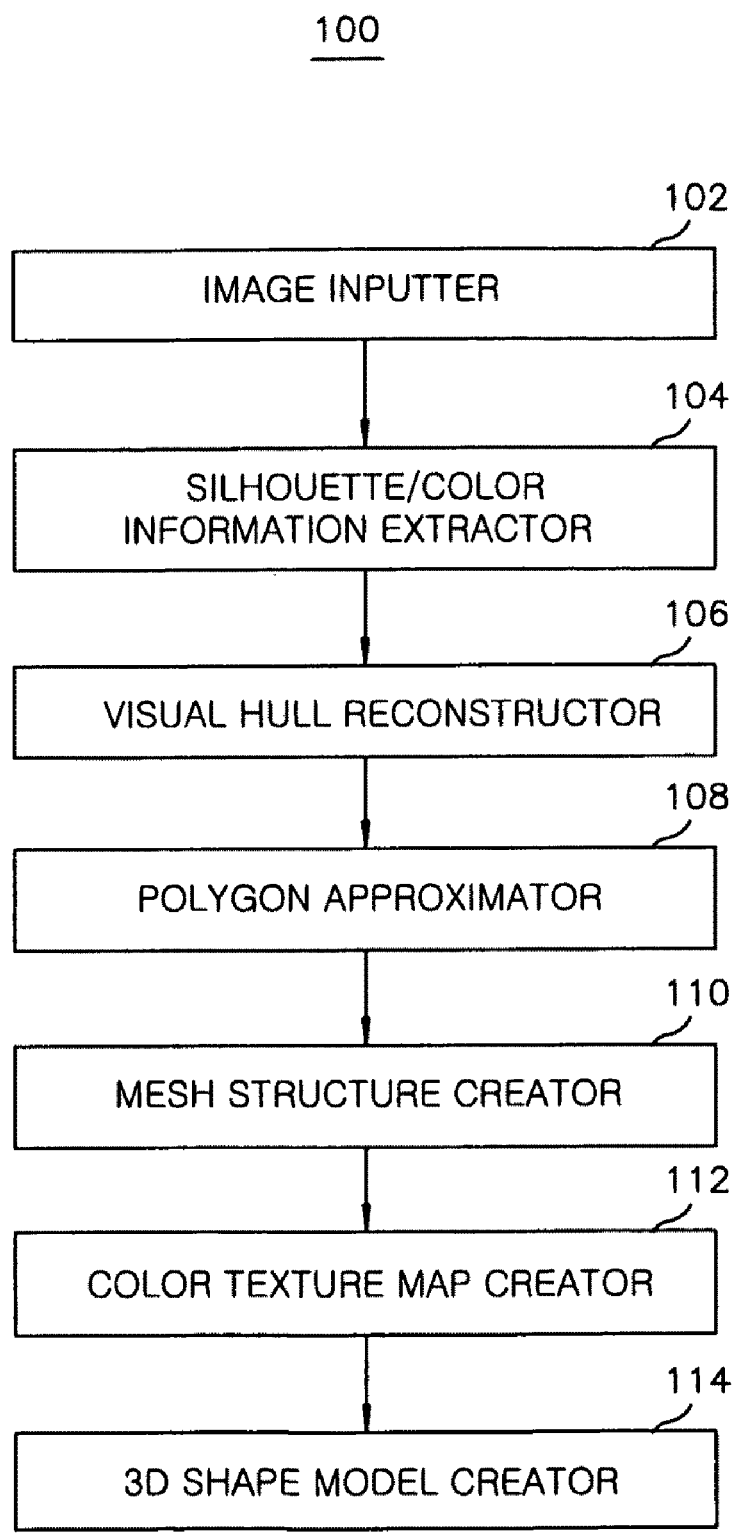
FIG. 1 is a block diagram illustrating an apparatus for reconstructing a 3D shape model of an object by using multi-view images in accordance with an embodiment of the present invention.

FIG. 1 is a block diagram illustrating an apparatus for reconstructing a 3D shape model of an object by using multi-view images in accordance with an embodiment of the present invention.

With reference to FIG. 1, reconstructs a 3D shape model of an object by using input multi-view images, and includes an image inputter 102, a silhouette/color extractor 104, a visual hull reconstructor 106, a polygon approximator 108, a mesh structure creator 110, a color texture map creator 112, and a 3D shape model creator 114.

The image inputter 102 inputs multi-view images photographed by a plurality of multi-view cameras surrounding an object, and transfers the input multi-view images to the silhouette/color extractor 104. The silhouette/color extractor 104 extracts a silhouette map representing a projection region of a reconstructed object and a color map, from each multi-view image. The visual hull reconstructor 106 reconstructs a visual hull in a voxel space by silhouette intersection using the extracted silhouette map.

Thereafter, the polygon approximator 108 approximates information about a geometric shape of the object to a polygon by extracting color corresponding points of the multi-view image from a polygon of a cross-section of the visual hull, to a polygon. After approximation of polygons is repeated until a polygon is no longer newly approximated, the mesh structure creator 110 creates an entire mesh structure by connecting the polygons for the cross-sections of the visual hulls.

The color texture map creator 112 creates a color texture map of a mesh structure by projecting shape information of an object that is expressed by a mesh structure to each multi-view image, and a 3D model creator 114 creates a 3D shape model by modeling natural shape information and surface color information of the object that contain the mesh structure and the color textures corresponding to meshes of the mesh structure.

Hereinafter, a method for creating a 3D shape model of an object by using the 3D shape model creating apparatus 100 having the blocks will be described.

Figure 2:
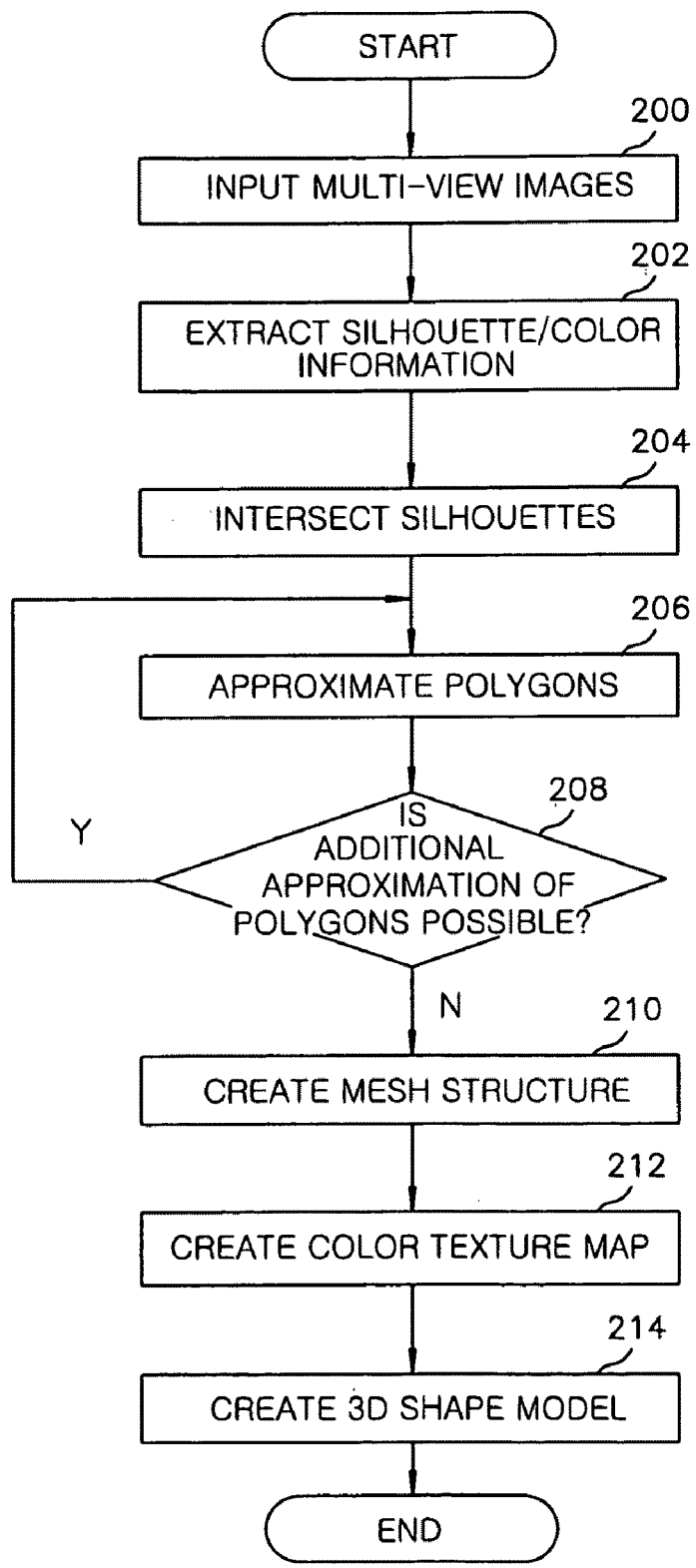
FIG. 2 is a flow chart illustrating a method for reconstructing a 3D shape model of an object by using multi-view images in accordance with an embodiment of the present invention.
Figure 3:
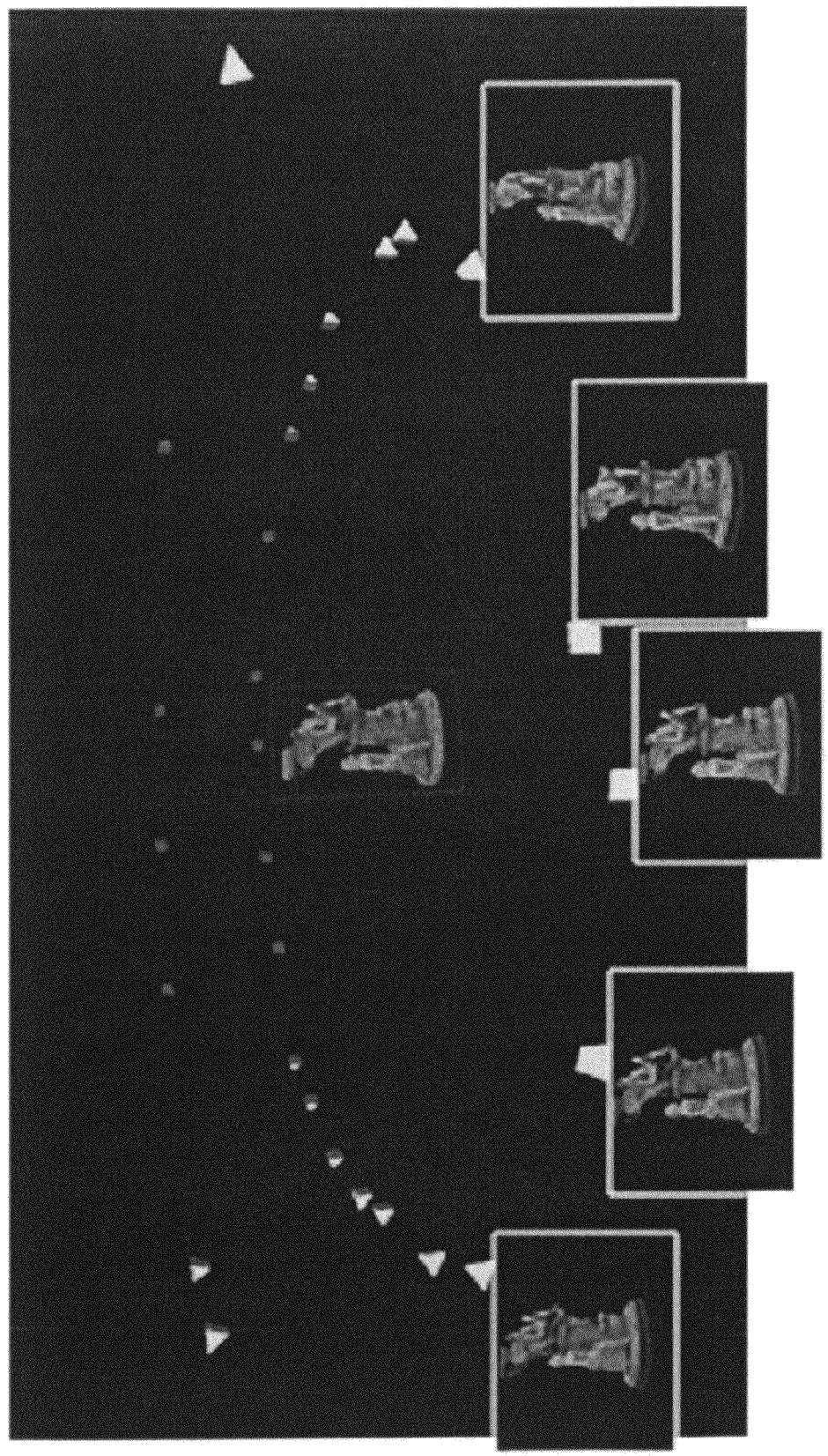
FIG. 3 is a view illustrating arrangement of multi-view cameras and setting of a 3D voxel space for reconstructing a 3D shape model of an object in accordance with an embodiment of the present invention.
Figure 4:
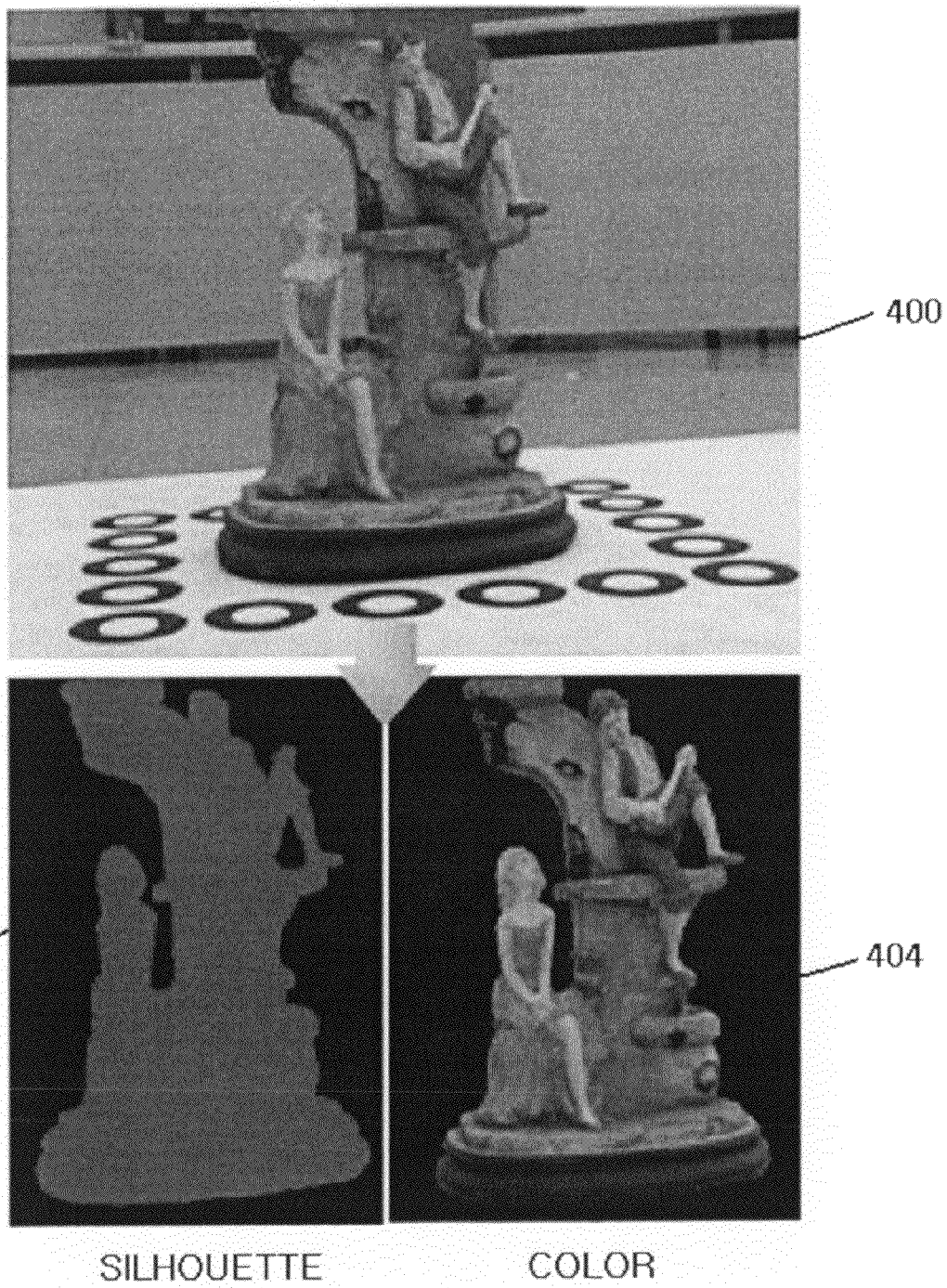
FIG. 4 is a view illustrating examples of an image input from a multi-view camera, a silhouette map of the input image, and a color map representing pixel color values of the silhouette map.
Figure 5:
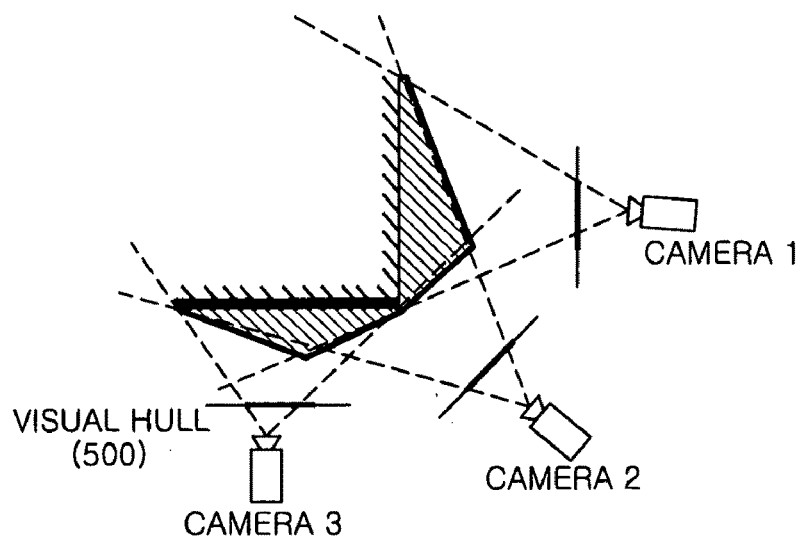
FIG. 5 is a view illustrating reconstruction of visual hulls using silhouette information in accordance with an embodiment of the present invention.
Figure 6:
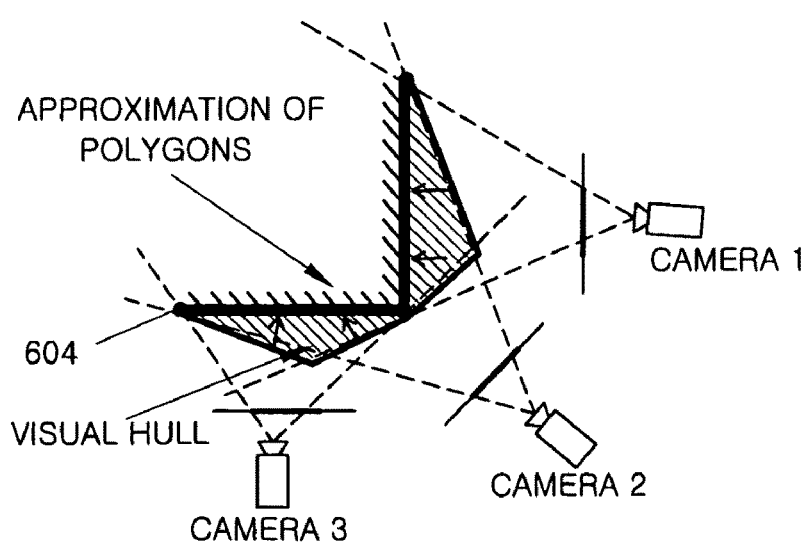
FIG. 6 is a view illustrating approximation of a geometric shape of an object by approximating polygons from visual hulls in accordance with an embodiment of the present invention.

FIG. 2 is a flow chart illustrating a method for reconstructing a 3D shape model of an object by using multi-view images in accordance with an embodiment of the present invention. FIG. 3 is a view illustrating arrangement of multi-view cameras and setting of a 3D voxel space for reconstructing a 3D shape model of an object in accordance with an embodiment of the present invention. FIG. 4 is a view illustrating examples of an image input from a multi-view camera, a silhouette map of the input image, and a color map representing pixel color values of the silhouette map. FIG. 5 is a view illustrating reconstruction of visual hulls using silhouette information in accordance with an embodiment of the present invention. FIG. 6 is a view illustrating approximation of a geometric shape of an object by approximating polygons from visual hulls in accordance with an embodiment of the present invention.

With reference to FIGS. 2 to 6, in the step 200 of FIG. 2, the image inputter 102 inputs multi-view images photographed by a plurality of multi-view cameras surrounding an object, and in the step 202, the silhouette/color extractor 104 extracts a silhouette map 402 that is a set of pixels to which an object region is projected and a color map 404 storing color values of the silhouette map 402, from a multi-view image 400.

Thereafter, the 3D shape model reconstructing apparatus 100 reconstructs a 3D shape model of the object by using pixels in a silhouette region of the multi-view image 400 and color values of the corresponding pixels. As in FIG. 3, the visual hull reconstructor 106 defines a voxel space containing a set of voxels of a predetermined size in a 3D space containing an object. In the step 204, the voxels in the voxel space are projected to the multi-view image, and if a projection region exists inside a foreground region of the silhouette map 402, the corresponding voxels are filled in the voxel space, and otherwise, the voxels disappear from the voxel space. This process is called silhouette intersection, and the 3D shape obtained by the silhouette intersection is called a visual hull 500.

The visual hull 500 is obtained using only silhouette information and contains an actual shape of an object. However, since a 3D shape of an object, the size of which is the same as or larger than that of the actual surface of the object, is reconstructed as in FIG. 5, reality is reduced if a texture is extracted in this state. Therefore, the polygon approximator 108 performs approximation of polygons using color information of a multi-view image in the step 206, so that a 3D shape model of an object that is reconstructed on the basis of a visual hull properly approximates shape information of the object.

A cross-section of the visual hull 500 shows that an outline of a region filled as in FIG. 5 is a continuous linear polygon. The actual shape of an object exists inside the polygon, and corresponding points 600, 602, and 604 are obtained by searching for color corresponding points along a polygon line created by projecting the line segments of the polygon as in FIG. 6.

If the polygon intersects with a plurality of color edges when it is projected to the multi-view image, new corresponding points are created at intersections and a new polygon is created by connecting adjacent ones of the new corresponding points. Approximation of polygons is continuously repeated for the cross-sections of the visual hulls until a polygon having intersection points with the color edges is no longer created no longer in the step 208, when line segments of an approximated polygon are projected to a multi-view image.

That is, approximation of polygons is repeated until a polygon is no longer created when an approximated polygon is continuously and repeatedly projected to a multi-view image having visibility, and when there is no additional approximation of polygons, the mesh structure creator 100 creates an entire mesh structure by connecting the polygons for the cross-sections of the visual hulls. The mesh structure created in this way appropriately approximates natural geometric shape information of the object.

The 3D shape expressed by a mesh structure via approximation of polygons is projected to all pixels corresponding to a silhouette region of an object when it is projected to a multi-view image, and edges between adjacent meshes in a mesh structure are deployed along color edge components of the surface of the object. That is, it approximately expresses an actual shape of an object and satisfies all silhouette maps of multi-view images.

In the step 212, the color texture map creator 112 creates color textures for meshes of the created mesh structure by projecting the meshes of the mesh structure to a multi-view image. The meshes are projected to the multi-view image on the basis of visibility information of the entire mesh structure. A color texture map of the entire mesh structure is created by employing color values of a projection region corresponding to a camera of the highest pixel occupancy, i.e. pixel color values of an image having a maximum projection area when meshes are projected to a multi-view image as textures of the meshes. A texture of each mesh includes a single color component or color texture, thereby maximizing the compressibility of a texture map of an object.

In the step 214, the 3D shape model creator 114 creates a 3D shape model of an object that can realize a 3D geometric shape and natural surface colors of the object.

As mentioned above, the present invention reconstructs a 3D shape model of an object that contains information about a 3D geometric shape and natural surface color textures of the object by using silhouette information and color information of multi-view images.

While the invention has been shown and described with respect to the embodiment, it will be understood by those skilled in the art that various changes and modifications may be made without departing from the scope of the invention as defined in the following claims.

What is claimed is:

1. A method for reconstructing a 3D shape model of an object by using multi-view image information, the method comprising:
    inputting multi-view images obtained by photographing the object from multiple viewpoints in a voxel space containing voxels of a predetermined size in a 3D space containing the object, and extracting silhouette information and color information of the multi-view images;
    reconstructing visual hulls by silhouette intersection using the silhouette information;
    approximating polygons of cross-sections of the visual hulls to a natural geometric shape of the object by using the color information, along the cross-sections of the visual hulls;
    expressing a 3D geometric shape of the object by connecting the approximated polygons to create a mesh structure;
    extracting color textures of a surface of the object by projecting meshes of the mesh structure to the multi-view image; and
    creating a 3D shape model by modeling natural shape information and surface color information of the object that contain the mesh structure and the color textures corresponding to the meshes of the mesh structure.

2. The method of claim 1, wherein the silhouette intersection reconstructs the visual hulls by projecting the voxels in the voxel space to the multi-view images and projecting a projection region to a silhouette map created using the silhouette information to fill the voxels in the silhouette map.

3. The method of claim 1, wherein approximating polygons comprises:
    creating an outline of a region with a continuous linear polygon based on a visual hull;
    searching for color corresponding points along a polygon line obtained by projecting line segments of the polygon to a multi-view image; and
    creating a new polygon, by creating new corresponding points at intersection points obtained by projecting the polygon to the multi-view image and making the projected polygon to intersect with a plurality of color edges, and by connecting adjacent ones of the new corresponding points.

4. The method of claim 3, wherein approximating polygons is repeated until a polygon is no longer created when an approximated polygon is continuously and repeatedly projected to a multi-view image having visibility.

5. The method of claim 1, wherein in extracting color textures, a color texture map of an entire mesh structure is extracted by registering pixel color values of an image having a maximum projection area to the corresponding texture area of a mesh in mesh structure when individual mesh is projected to the multi-view images.

6. An apparatus for reconstructing a 3D shape model of an object by using multi-view image information, the apparatus comprising:
- a silhouette/color information extractor receiving multi-view images obtained by photographing the object from multiple viewpoints in a voxel space containing voxels of a predetermined size in a 3D space containing the object, and extracting silhouette information and color information of the multi-view images;
- a visual hull reconstructor reconstructing visual hulls by using silhouette intersection reflecting the silhouette information;
- a polygon approximator approximating polygons of cross-sections of the visual hulls to a natural geometric shape of the object by using the color information, along with the cross-sections of the visual hulls;
- a mesh structure creator expressing a 3D geometric shape of the object by connecting the approximated polygons to create a mesh structure;
- a color texture map creator extracting color textures of a surface of the object by projecting meshes of the mesh structure to the multi-view image; and
- a 3D shape model creator creating a 3D shape model by modeling natural shape information and surface color information of the objects that contain the mesh structure and the color textures corresponding to the meshes of the mesh structure.

7. The apparatus of claim 6, wherein the silhouette intersection reconstructs the visual hulls by projecting the voxels in the voxel space to the multi-view images and projecting a projection region to a silhouette map created using the silhouette information to fill the voxels in the silhouette map.

8. The apparatus of claim 6, wherein the polygon approximator: creates an outline of a region with a continuous linear polygon based on a visual hull; searches for color corresponding points along a polygon line obtained by projecting line segments of the polygon to the multi-view image; and creates a new polygon, by creating new corresponding points at intersection points obtained by projecting the polygon to the multi-view image and making the projected polygon to intersect with a plurality of color edges, and by connecting adjacent ones of the new corresponding points.

9. The apparatus of claim 6, wherein the polygon approximator repeats approximation of polygons until a polygon is no longer created when an approximated polygon is continuously and repeatedly projected to a multi-view image having visibility.

10. The apparatus of claim 6, wherein the color texture map creator extracts a color texture map of an entire mesh structure, by registering pixel color values of an image having a maximum projection area to the corresponding texture area of a mesh in mesh structure when individual mesh is projected to the multi-view images.

* * * * *